United States Patent
Folberth

(10) Patent No.: US 7,679,368 B2
(45) Date of Patent: Mar. 16, 2010

(54) REFLECTION COEFFICIENT MEASUREMENT FOR WATER-BASED MUD RESISTIVITY IMAGING

(75) Inventor: Martin Folberth, Lower Saxony (DE)

(73) Assignee: Baker Hughes Incorporated, Houston, TX (US)

( * ) Notice: Subject to any disclaimer, the term of this patent is extended or adjusted under 35 U.S.C. 154(b) by 735 days.

(21) Appl. No.: 11/496,158

(22) Filed: Jul. 31, 2006

(65) Prior Publication Data

US 2007/0029083 A1 Feb. 8, 2007

Related U.S. Application Data

(60) Provisional application No. 60/705,333, filed on Aug. 4, 2005.

(51) Int. Cl.
*G01V 3/18* (2006.01)
*G01V 3/20* (2006.01)
*G01V 3/02* (2006.01)

(52) U.S. Cl. .................. 324/355; 324/367

(58) Field of Classification Search .......... 324/333, 324/354–358, 365–370; 166/254.2
See application file for complete search history.

(56) References Cited

U.S. PATENT DOCUMENTS

| 2,930,969 | A | 3/1960 | Baker | 324/10 |
|---|---|---|---|---|
| 3,365,658 | A | 1/1968 | Birdwell | 324/10 |
| 3,722,589 | A | 3/1973 | Smith et al. | 166/250 |
| 4,122,387 | A | 10/1978 | Ajam et al. | 324/10 |
| 4,373,254 | A | 2/1983 | Blumenfeld | 29/578 |
| 4,468,623 | A | 8/1984 | Gianzero et al. | 324/367 |
| 5,396,175 | A | 3/1995 | Seeman | 324/375 |
| 5,502,686 | A | 3/1996 | Dory et al. | 367/34 |
| 5,869,968 | A | 2/1999 | Brooks et al. | 324/338 |
| 6,025,722 | A | 2/2000 | Evans et al. | 324/373 |
| 6,173,793 | B1 | 1/2001 | Thompson et al. | 175/45 |

FOREIGN PATENT DOCUMENTS

| CA | 685727 | 5/1964 |
|---|---|---|
| GB | 2406650 A | 4/2005 |

OTHER PUBLICATIONS

J.W. Smits et al.; *High Resolution From a New Laterolog With Azimuthal Imaging*, SPE 30584, 1995 SPE Annual Technical Conference and Exhibition, Oct. 22-25, 1995, pp. 563-576, 14 Figs.

D.H. Davies et al.; *Azimuthal Resistivity Imaging: A New-Generation Laterolog*, SPE Formation Evaluation, Sep. 1994, pp. 165-174, 18 Figs.

*Primary Examiner*—Bot L LeDynh
(74) *Attorney, Agent, or Firm*—Madan & Sriram, P.C.

(57) ABSTRACT

A galvanic resistivity tool with one or more measurement electrodes and guard electrodes, and one or more shielding electrodes. The impedance seen by the measurement electrode (indicative of the formation resistivity) is determined by using a directional coupler that measures a reflection coefficient of an electrical signal.

13 Claims, 5 Drawing Sheets

REFLECTION COEFFICIENT MEASUREMENT FOR WATER-BASED MUD RESISTIVITY IMAGING

CROSS-REFERENCES TO RELATED APPLICATIONS

This application claims priority from U.S. Provisional Patent Application Ser. No. 60/705,333 filed on 4 Aug. 2005.

BACKGROUND OF THE INVENTION

1. Field of the Invention

The present invention relates to well logging. In particular, the present invention is an apparatus and method for determining the resistivity of subsurface formations using electrical methods.

2. Background of the Art

In conventional galvanic resistivity measurement tools using a focusing technique, a guard electrode emits current in order to lead the current beam of a measurement electrode deeper into a conductive material. The resistivity of the material is determined by means of measurement electrode's voltage and current registration. The driving potential on guard and measurement electrode must be exactly the same to avoid disturbances of the ideal electrical field, which makes sure that the focusing effect takes place. Higher driving potential differences may lead to currents from guard to measurement electrode or vice versa passing the borehole fluid around the tool, which would completely destroy the focusing effect and lead to high measurement errors if not considered. In general, the focusing effect will lead to an electrical current with a higher penetration depth compared to that without focusing.

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems Techniques for investigating the earth formation with arrays of measuring electrodes have been proposed. See, for example, the U.S. Pat. No. 2,930,969 to Baker, Canadian Pat. No. 685,727 to Mann et al. U.S. Pat. No. 4,468,623 to Gianzero, and U.S. Pat. No. 5,502,686 to Dory et al. The Baker patent proposed a plurality of electrodes, each of which was formed of buttons which are electrically joined by flexible wires with buttons and wires embedded in the surface of a collapsible tube. The Mann patent proposes an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described.

The Gianzero patent discloses tool mounted pads, each with a plurality of small measurement electrodes from which individually measurable survey currents are injected toward the wall of the borehole. The measurement electrodes are arranged in an array in which the measurement electrodes are so placed at intervals along at least a circumferential direction (about the borehole axis) as to inject survey currents into the borehole wall segments which overlap with each other to a predetermined extent as the tool is moved along the borehole. The measurement electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measurement electrodes is provided around a central electrode with the array used to detect the spatial pattern of electrical energy injected by the central electrode. In another embodiment, a linear array of measurement electrodes is provided to inject a flow of current into the formation over a circumferentially effectively contiguous segment of the borehole. Discrete portions of the flow of current are separately measurable so as to obtain a plurality of survey signals representative of the current density from the array and from which a detailed electrical picture of a circumferentially continuous segment of the borehole wall can be derived as the tool is moved along the borehole. In another form of an array of measurement electrodes, they are arranged in a closed loop, such as a circle, to enable direct measurements of orientations of resistivity of anomalies The Dory patent discloses the use of an acoustic sensor in combination with pad mounted electrodes, the use of the acoustic sensors making it possible to fill in the gaps in the image obtained by using pad mounted electrodes due to the fact that in large diameter boreholes, the pads will necessarily not provide a complete coverage of the borehole.

The electrochemical equilibration process between a metal (e.g. electrode) and an electrolytic fluid leads to layers of complex resistive behavior. The impedance of these layers is called contact impedance. When current flows into or from an electrode, a difference between the potential immediately outside and inside the electrode will be created by the impedance layer. Contact impedances are highly variable and non-linear. They depend mainly on electrode material, electrochemical properties of the fluid, current density and frequency of the applied voltages. In natural environments, the formation is filled with fluid whose chemical composition is not completely controllable, it is almost impossible to predict exactly contact impedances for measurement and guard electrodes. The focusing effect will be weakened or damaged whenever the potentials of guard and measurement electrodes beyond the impedance layer become different. This difference could cause a current to flow through the mud between the electrodes. The contact impedance thus has at least significant impact on the resolution of the measurement.

U.S. Pat. No. 6,373,254 to Dion et al. describes a method and apparatus to control the effect of contact impedance on a formation resistivity measurement during a logging-while-drilling operation. The control of contact impedance is accomplished by maintaining a substantially zero difference in potential between two monitor electrodes positioned on the resistivity logging tool near a current electrode.

Others have discussed the use of monitor electrodes for wireline applications. See, for example, Davies et al.

(SPE24676), Evans et al. (U.S. Pat. No. 6,025,722), Seeman (U.S. Pat. No. 5,396,175), Smits et al. (SPE 30584), and Scholberg (U.S. Pat. No. 3,772,589). The monitor electrode technique uses two additional electrodes (called monitor electrodes) located between measurement and guard electrode to observe a possible potential difference. The potential on measurement or guard electrode is adjusted by means of a control circuit in order to keep the voltage between the monitor electrodes ideally at zero. Monitor electrodes emit no current and are therefore assumed to be unaffected by contact impedances. From the minimum voltage drop between the monitor electrodes it is concluded that the potential difference between guard and measurement electrodes each beyond the impedance layer immediately outside the electrode is zero.

FIG. 3 (prior art) is a schematic diagram of a typical resistivity imaging tool suitable for use in water-based mud. The formation is depicted by 151. The imaging tool includes one or more center electrodes (measurement electrodes) 157, one or more guard electrodes 155 which focus the measure current, and a return electrode 153, (usually the tool body). An AC voltage source is connected between the guard and return electrodes, resulting in a current flow from guard to return through the drilling mud and the formation. The measurement electrode is connected to the guard electrode by means of a current transformer, providing a negligible impedance between guard and current electrode, thus allowing for a current to flow through the current electrode into the formation. This current is then measured with the current transformer and associated electronics.

FIG. 4 (prior art) is a schematic circuit diagram of prior art resistivity measurement devices. $Z_g$ represents the impedance from the guard electrode to the return electrode, $Z_c$ the impedance from measurement electrode to the return electrode, and $Z_m$ the mud channel impedance between measurement electrode and the guard electrode. The measurement transformer impedance between measurement electrode and the guard electrode is assumed to be negligible compared to $Z_m$, so that there is virtually no current flow through the mud between the measurement electrode and the guard electrode.

With the measured center current $I_c$ and the (also measured) voltage source output voltage $V_0$, the measurement electrode impedance $Z_c$ can be calculated:

$$Z_c = \frac{V_0}{I_c}. \tag{1}$$

All the parameters in Eqn. (1) may be complex numbers.

There are two problems with the prior art configuration that have not been addressed in the past. Firstly, the signal-to-noise ratio of the galvanic resistivity imaging tool is largely dependent on the current amplifier equivalent input voltage noise, which limits the precision of the measurement system for a given electrode voltage. Conversely, the required signal-to-noise ratio determines the electrode voltage.

Secondly, since currents in the guard electrode and the measurement electrode are substantially independent, there can be several orders of magnitude difference between these currents. The magnetic field generated by the current in the guard electrode couples into the current measurement transformer TX1 and leads to severe crosstalk. This can result in large measurement errors depending upon the ratio of currents in the guard electrode and the measurement electrode. This results in the dynamic range of the measurement system becoming a function of this current ratio. The present invention addresses these two problems to give an improved method and apparatus for determination of resistivity images of earth formations.

SUMMARY OF THE INVENTION

One embodiment of the invention is an apparatus for determining a resistivity parameter of an earth formation. The apparatus includes a logging tool in a borehole in the earth formation. The logging tool has at least one measurement electrode that conveys a measure current into the earth formation. At least one guard electrode associated with the at least one measurement electrode focuses the measure current. A directional coupler enables determination of the impedance associated with the measurement electrode. The apparatus includes circuitry that minimizes a current flow between the at least one measurement electrode and the guard electrode. An orientation sensor may be provided, the output of the orientation sensor being used to provide a resistivity image of the borehole. The coupling device may be part of a bottomhole assembly (BHA) conveyed on a drilling tubular into the borehole, in which case the processor may make a determination of the parameter during continued rotation of the BHA.

Another embodiment of the invention is a method of determining a resistivity parameter of an earth formation. A measure current is conveyed into the earth formation using a measurement electrode on a logging tool in the earth formation. The measure current is focused using a guard electrode on the logging tool. An impedance at the measurement electrode is determined using a directional coupler. A current flow between the measurement electrode and the guard electrode is minimized. The logging tool may be conveyed into the borehole on a drilling tubular with a bottomhole assembly carrying the logging tool, or on a wireline. A resistivity image of the borehole may be produced.

Another embodiment of the invention is a computer readable medium for use with a logging tool used in a borehole in an earth formation. The logging tool includes a measurement electrode which conveys a measure current into the earth formation and a guard electrode which focuses the measure current. The medium includes instructions enabling the determination of an apparent impedance at the measurement electrode using measurements made by a directional coupler.

BRIEF DESCRIPTION OF THE FIGURES

The novel features that are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE INVENTION

Figure 1:
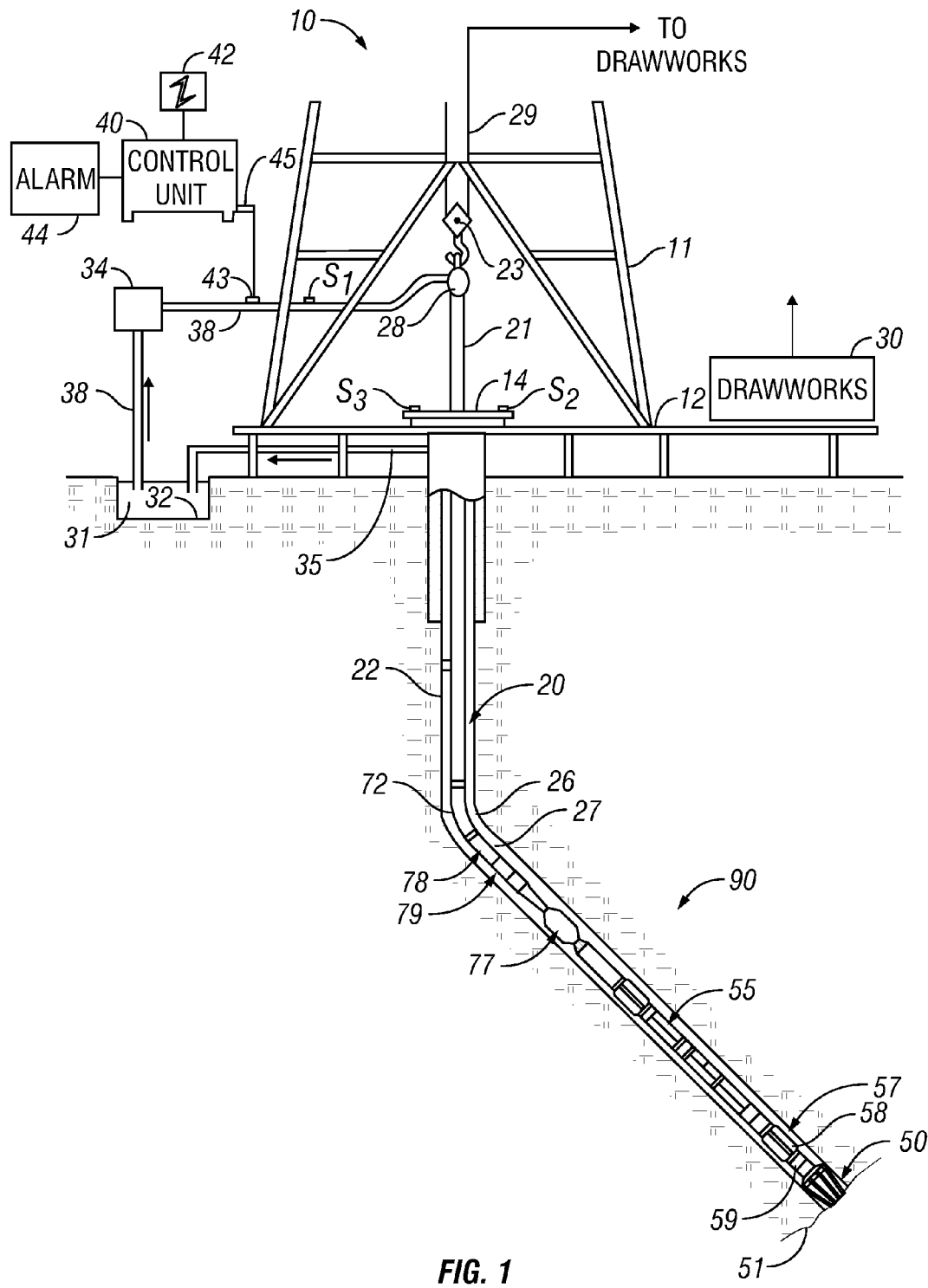
FIG. 1 (prior art) is a schematic illustration of a drilling system.

FIG. 1 (prior art) shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel, 28 and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger 36, fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

Figure 2:
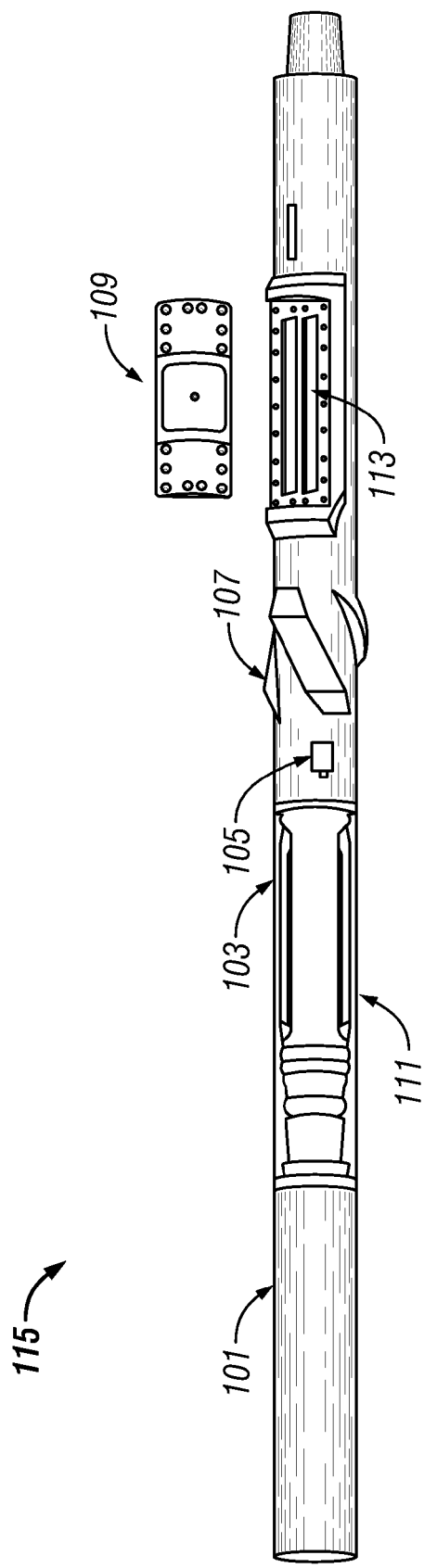
FIG. 2 (prior art) is an exemplary configuration of the various components of a resistivity measuring sensor sub.

Turning now to FIG. 2, an exemplary configuration of the various components of the resistivity measuring sensor sub is shown. At the upper end, a modular cross-over sub 101 is provided. The power and processing electronics are indicated by 103. The sub is provided with a stabilizer 107 and a data dump port may be provided at 105. A resistivity sensor (discussed further below) is provided at 109 with the sensor and measuring electronics at 113. Modular connections 115 are provided at both ends of the sub that enable the sub to be part of the bottom hole drilling assembly. An orientation sensor 111 is provided for measuring the toolface angle of the sensor assembly during continued rotation. Different types of orientation sensors may be used, including magnetometers, accelerometers, or gyroscopes. Use of such devices for determination of the toolface angle are known in the art and are not discussed further herein.

The stabilizer shown at 107 serves several functions. Like conventional stabilizers, one function is to reduce oscillations and vibrations of the sensor assembly. However, in the context of the present invention, it also serves another important function, viz, centralizing the portion of the bottom hole assembly (BHA) including a sensor assembly, and also maintaining the sensors with a specified standoff from the borehole wall. This is not visible in FIG. 2, but the outer diameter of the stabilizer is greater than the outer diameter of the portion of the BHA including the resistivity sensor. As a result of this difference in diameter, the resistivity sensor is maintained with a standoff from the borehole wall during continued rotation of the drillstring.

The present invention uses a bridge coupler as part of the apparatus for making resistivity measurements. Generally, any complex impedance can be measured at a given frequency with a so-called bridge coupler, which is normally used for measuring reflection coefficients at RF frequencies and higher. U.S. patent application Ser. No. 11/088,443 of Folberth et al., having the same assignee as the present invention and the contents of which are incorporated herein by reference, teaches a method for using reflection coefficient measurements for oil-based mud imaging. Some of the material from the Folberth application is reproduced here to give an understanding the general terminology.

Figure 5:
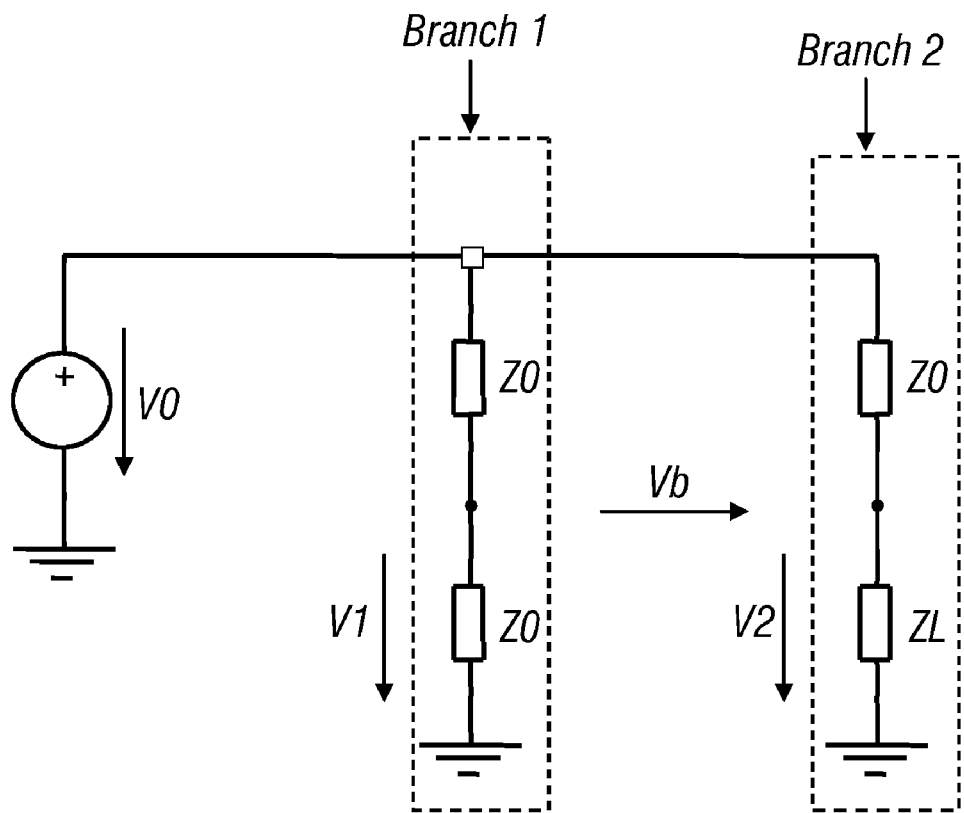
FIG. 5 is a circuit diagram of a directional coupler.

FIG. 5 is a circuit diagram illustrating a bridge coupler. A voltage source $V_0$ applied to two parallel branches of a network. Branch 1 is a series network of two impedances $Z_0$, whereas the other branch consists of $Z_0$ in series with the (to be measured) impedance $Z_L$, with $Z_0$ being real and $Z_L$ being complex. Branch 1 can be interpreted as a voltage source with an external source impedance $Z_0$ being terminated by $Z_0$ (perfect match situation). Therefore, $V_1$ can be expressed as $$V_1 = \frac{V_0}{2}. \tag{2}$$

The term $Z_0$ may be referred to as a reference impedance.

In Branch 2, the voltage source with an external source impedance $Z_0$ is terminated by $Z_L$. Therefore, the voltage $V_2$ can be expressed as the sum of a forward (or incident) voltage $V_f$ traveling from the generator (consisting of voltage source $V_0$ and the external load impedance $Z_0$) to the load and a reflected voltage $V_r$ reflected by the load $Z_L$ due to a load mismatch.

$$V_2 = V_f + V_r \tag{3}.$$

$V_f$ can now be acquired by measuring $V_1$ in Branch 1. Since we have perfect match in Branch 1, $V_r$=0 and $V_1$ equals $V_f$ in that branch.

The reflection coefficient of any complex load is $$\Gamma = \frac{V_r}{V_f}. \quad (4)$$

From the circuit of FIG. 5, when $V_1$ and $V_2$ are measured, $V_b$ can be expressed as $$V_b = V_1 - V_2 \quad (5).$$

This gives the result $$V_b = V_f - V_f - V_r$$
$$V_b = -V_r \quad (6).$$

The reflection coefficient can now be expressed as $$\Gamma = \frac{-V_b}{V_1} = \frac{V_2 - V_1}{V_1} = \frac{V_2}{V_1} - 1. \quad (7)$$

The impedance $Z_L$ can now be calculated from the reflection coefficient as $$Z_L = Z_0 \frac{1+\Gamma}{1-\Gamma}. \quad (8)$$

Figure 3:
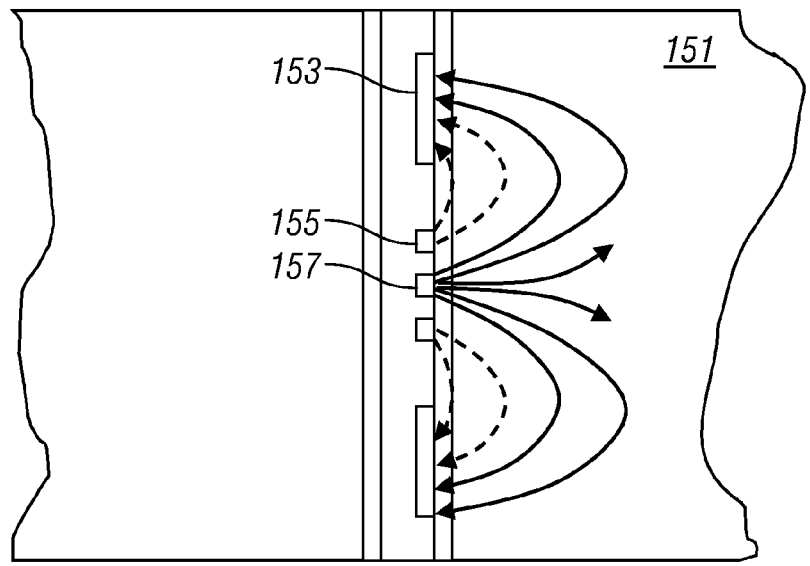
FIG. 3 (prior art) is a schematic illustration of the electrode configurations for a prior art resistivity imaging device.
Figure 4:
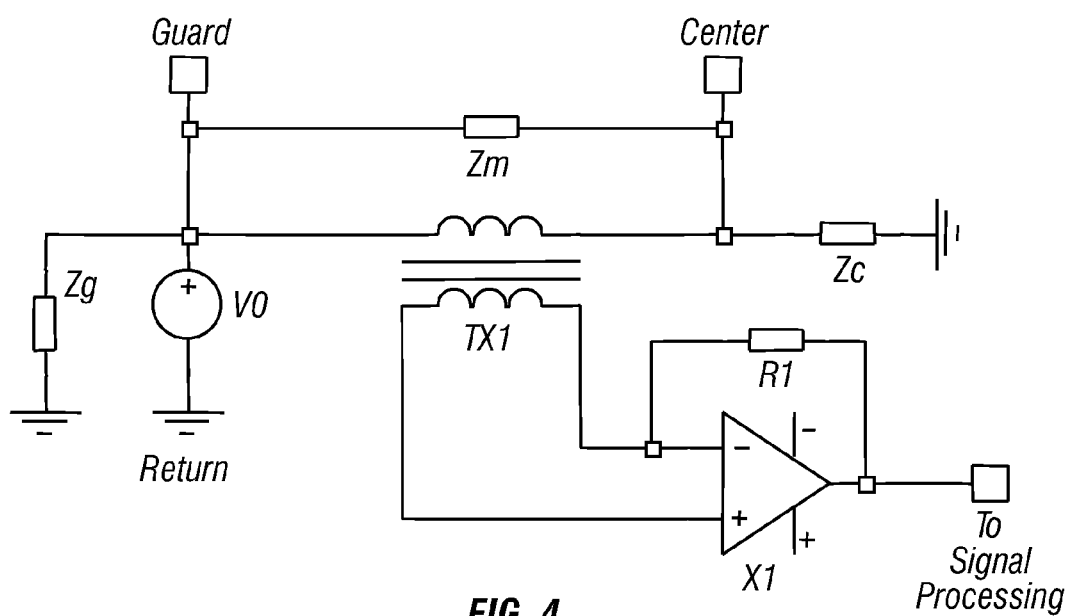
FIG. 4 (prior art) shows an equivalent circuit for the electrode configuration of FIG. 3.
Figure 6:
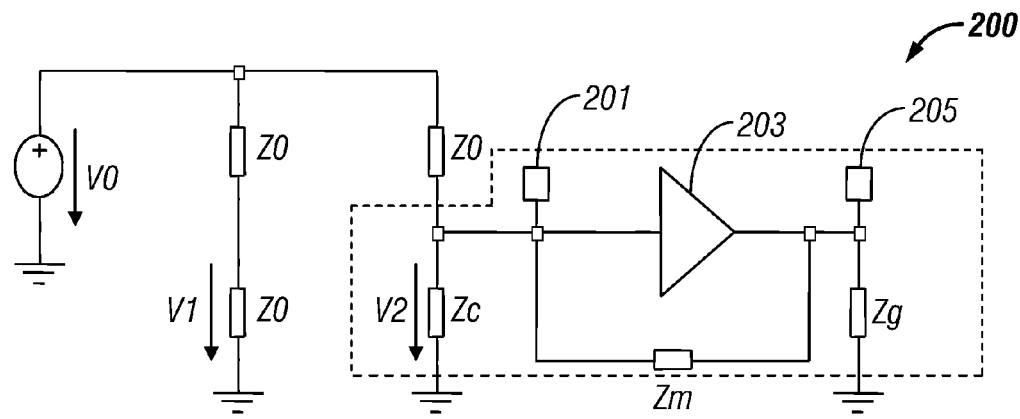
FIG. 6 shows a circuit diagram of an embodiment of the present invention that uses a directional coupler to determine an impedance at a measurement electrode.

The use of a bridge coupler for resistivity measurements is schematically represented by the configuration in FIG. 6. A directional coupler is set up by connecting the output of $Z_0$ in FIG. 5 to the measure electrode 201 so that load $Z_L$ in FIG. 5 is replaced by an equivalent load 200 that includes the (desired) impedance of the formation $Z_c$ at the measure electrode 201, the mud impedance $Z_m$ between the measure electrode and the guard electrode 205 and the impedance between the guard electrode and the formation $Z_g$. The control circuit 203 maintains the guard voltage sufficiently close to the voltage of the measure electrode to avoid significant mud currents through $Z_m$. Under these conditions, the reflection coefficient measured by the bridge coupler is indicative of the desired impedance $Z_c$. With such an arrangement, some of the disadvantages of the prior art methods are significantly alleviated. Specifically, in the absence of the transformer coupling of prior art (see FIG. 4), the problem of cross-talk is eliminated. Note that an exemplary configuration of the measure electrode and the guard electrode has been discussed with respect to prior art, shown in FIGS. 2 and 3.

Figure 7:
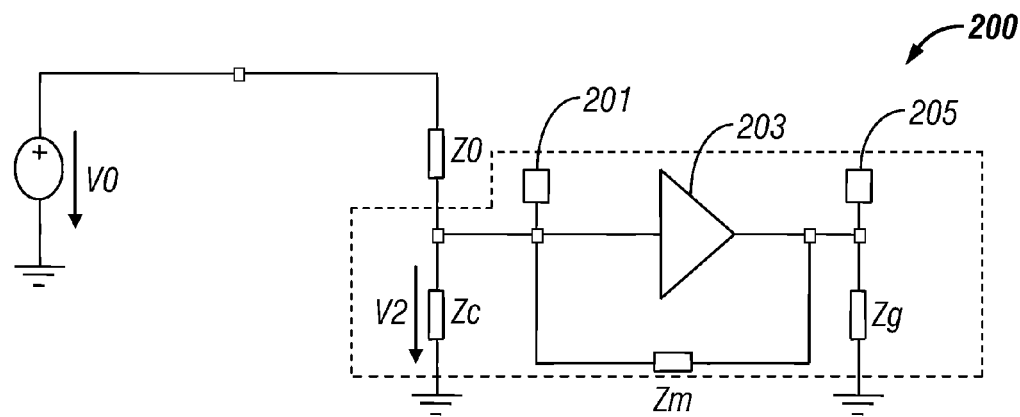
FIG. 7 shows a circuit diagram of an alternate embodiment of the present invention that uses a directional coupler to determine an impedance at a measurement electrode.

Another embodiment of the invention is to eliminate Branch 1 in FIG. 5 and to substitute the $V_1$ measurement by a $V_0$ measurement and use Eqn. 2 to calculate $V_0$ from $V_1$. This is practical for a sufficiently low-impedance voltage source $V_0$ that has a negligible internal source impedance compared to $Z_0$. Note that FIGS. 5 and 6 show a perfect voltage source without any internal source impedance. This alternate embodiment of the invention without Branch 1 is depicted in FIG. 7. This is similar to FIG. 6 with Branch 1 removed.

In water based mud, the contribution to the measured impedance at the measurement electrode from the mud is small, so that the measured impedance is dominated by the formation impedance. As noted above, the measured reflection coefficient (and impedance) may be a complex quantity. This enables the determination of not only the formation resistivity but also the formation permittivity (or dielectric constant).

With the apparatus and method of the present invention, a resistivity image can be obtained in a MWD environment using orientation measurements by a suitable orientation sensor such as a magnetometer. Methods of producing such images are discussed, for example, in U.S. Pat. No. 6,173,793 to Thompson et al., having the same assignee as the present invention and the contents of which are incorporated herein by reference. The method of the present invention may also be used to produce a resistivity image of an earth formation using a plurality of pads conveyed on a wireline, each of the pads containing a plurality of measure electrodes, guard electrodes and bridge-coupling circuits.

The processing of the data may be done by a downhole processor to give corrected measurements substantially in real time. Alternatively, the measurements could be recorded downhole, retrieved when the drillstring is tripped, and processed using a surface processor. Implicit in the control and processing of the data is the use of a computer program on a suitable machine readable medium that enables the processor to perform the control and processing. The machine readable medium may include ROMs, EPROMs, EEPROMs, Flash Memories and Optical disks.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for evaluating an earth formation, the apparatus comprising:
    a logging tool configured to be conveyed in a borehole;
    at least one measure electrode on the logging tool configured to convey a measure current into the formation; and
    a directional coupler configured to enable determination of an impedance associated with the measure electrode.

2. The apparatus of claim 1 further comprising:
    (i) at least one guard electrode on the logging tool configured to focus the measure current, and
    (ii) circuitry configured to reduce a current flow between the at least one measure electrode and the at least one guard electrode.

3. The apparatus of claim 1 wherein a reflection coefficient measured by the directional coupler circuit is indicative of a formation resistivity.

4. The apparatus of claim 3 wherein the formation resistivity is related to the reflectivity by a relation of the form $$Z_L = Z_0 \frac{1+\Gamma}{1-\Gamma}$$

Where $Z_L$ is the formation resistance, $Z_0$ is a reference impedance of the directional coupler and $\Gamma$ is a measured reflection coefficient.

5. The apparatus of claim 1 further comprising a processor configured to determine a resistivity of the formation using an output of the directional coupler.

6. The apparatus of claim 1 wherein the logging tool is configured to be conveyed on a bottomhole assembly (BHA), the apparatus further comprising:
    (i) an orientation sensor configured to make measurements of a toolface angle of the BHA during rotation thereof; and
    (ii) a processor configured to use a resistivity determined from the output of the directional coupler and the measurements of the toolface angle to provide a resistivity image of the earth formation.

7. The apparatus of claim 1 further comprising a conveyance device configured to convey the logging tool into the borehole, the conveyance device selected from (i) a wireline and (ii) a drilling tubular.

8. A method of evaluating an earth formation, the method comprising:
conveying a logging tool into a borehole;
conveying a measure current into the formation using at least one measure electrode on the logging tool; and
using a directional coupler for determining an impedance associated with the measure electrode.

9. The method of claim 8 further comprising:
(i) using at least one guard electrode on the logging tool for focusing the measure current, and
(ii) maintaining the at least one measure electrode at substantially the same potential as the at least one measure electrode.

10. The method of claim 1 wherein determining the impedance associated with the measure electrode further comprises using the directional coupler for measuring a reflection coefficient.

11. The method of claim 10 further comprising using a relation of the form $$Z_L = Z_0 \frac{1+\Gamma}{1-\Gamma}$$

Where $Z_L$ is the formation resistance, $Z_0$ is a reference impedance of the directional coupler and $\Gamma$ is a measured reflection coefficient.

12. The method of claim 8 further comprising:
(i) conveying the logging tool into the borehole on a bottomhole assembly (BHA):
(ii) making measurements of a toolface angle of the BHA during rotation thereof; and
(iii) using a resistivity determined from the output of the bridge coupling circuit and the measurements of the toolface angle for producing a resistivity image of the earth formation.

13. The method of claim 12 further comprising conveying the logging tool into the borehole using a conveyance device selected from (i) a wireline, and (ii) a drilling tubular.

* * * * *

UNITED STATES PATENT AND TRADEMARK OFFICE
CERTIFICATE OF CORRECTION

PATENT NO. : 7,679,368 B2 Page 1 of 1
APPLICATION NO. : 11/496158
DATED : March 16, 2010
INVENTOR(S) : Martin Folberth It is certified that error appears in the above-identified patent and that said Letters Patent is hereby corrected as shown below:

Column 9, claim 9, line 18, delete "measure", insert --guard--; and

Column 10, claim 12, line 16, delete "output of the", insert --output of a--.

Signed and Sealed this

Twentieth Day of July, 2010

David J. Kappos
*Director of the United States Patent and Trademark Office*